US012759526B2

(12) United States Patent
Georgin et al.

(10) Patent No.: US 12,759,526 B2
(45) Date of Patent: Oct. 13, 2026

(54) CONTROL FOR AN ELECTROMECHANICAL BRAKE ACTUATOR

(71) Applicant: GOODRICH CORPORATION, Charlotte, NC (US)

(72) Inventors: Marc J Georgin, Oakwood, OH (US); Kaman Thapa Magar, Beavercreek, OH (US); Jake Ferris, Dublin, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 341 days.

(21) Appl. No.: 18/513,352

(22) Filed: Nov. 17, 2023

(65) Prior Publication Data

US 2025/0162562 A1 May 22, 2025

(51) Int. Cl.

| | |
|---|---|
| ***B60T 17/22*** | (2006.01) |
| ***B60T 7/12*** | (2006.01) |
| ***B60T 8/17*** | (2006.01) |
| ***B64C 25/44*** | (2006.01) |
| ***F16D 55/38*** | (2006.01) |
| ***F16D 65/18*** | (2006.01) |
| ***F16D 66/00*** | (2006.01) |

(Continued)

(52) U.S. Cl.
CPC ................ *B60T 17/22* (2013.01); *B60T 7/12* (2013.01); *B60T 8/1703* (2013.01); *B64C 25/44* (2013.01); *F16D 55/38* (2013.01); *F16D 65/18* (2013.01); *F16D 66/00* (2013.01); *F16D 2066/003* (2013.01); *F16D 2066/005* (2013.01); *F16D 2066/006* (2013.01); *F16D 2125/40* (2013.01); *F16D 2127/02* (2013.01)

(58) Field of Classification Search
CPC .......... B60T 17/22; B60T 7/12; B60T 8/1703; B60T 13/741; B64C 25/44; F16D 55/38; F16D 65/18; F16D 66/00; F16D 2066/003; F16D 2066/005; F16D 2066/006; F16D 2125/40; F16D 2127/02
See application file for complete search history.

(56) References Cited

U.S. PATENT DOCUMENTS

| | | | |
|---|---|---|---|
| 6,003,640 | A | 12/1999 | Ralea |
| 8,180,548 | B2 | 5/2012 | Cahill |

(Continued)

OTHER PUBLICATIONS

European Patent Office, European Search Report dated May 1, 2025 in Application No. 24213659.6.

(Continued)

*Primary Examiner* — David R Morris
(74) *Attorney, Agent, or Firm* — SNELL & WILMER L.L.P.

(57) ABSTRACT

A brake system includes a pressure plate, an end plate, a plurality of rotating discs positioned between the pressure plate and the end plate, an electromechanical brake actuator controller, and an electromechanical brake actuator including a ball screw configured to extend to exert force on the pressure plate, the electromechanical brake actuator operatively coupled to the electromechanical brake actuator controller. Responsive to receiving a command from the electromechanical brake actuator controller, the electromechanical brake actuator is configured to retract the ball screw away from the pressure plate to at least a zero-touch point.

14 Claims, 5 Drawing Sheets

(51) Int. Cl.

*F16D 125/40* (2012.01)
*F16D 127/02* (2012.01)

(56) References Cited

U.S. PATENT DOCUMENTS

| | | | | |
|---|---|---|---|---|
| 8,666,625 | B1 | 3/2014 | Georgin | |
| 10,597,008 | B1 | 3/2020 | Arsenault | |
| 11,529,935 | B2 | 12/2022 | Mastrocola et al. | |
| 11,643,059 | B2 | 5/2023 | Rossi et al. | |
| 2003/0029680 | A1* | 2/2003 | Ralea | B60T 13/74 188/195 |
| 2005/0269872 | A1 | 12/2005 | Ralea | |
| 2016/0041058 | A1* | 2/2016 | Georgin | F16D 55/38 702/98 |
| 2018/0023648 | A1 | 1/2018 | Singh | |

OTHER PUBLICATIONS

European Patent Office, European Office Action dated May 12, 2026 in Application No. 24213659.6.

* cited by examiner

CONTROL FOR AN ELECTROMECHANICAL BRAKE ACTUATOR

FIELD

The present disclosure relates to aircraft braking systems, and more specifically, to control for an electromechanical brake actuator.

BACKGROUND

Typically, an aircraft may comprise a plurality of electromechanical brake (E-brake) assemblies that are configured to apply force to a brake stack on an aircraft wheel. Typically, a load cell signal is utilized for brake force measurement and feedback for accurate force control. A typical E-brake contains four electromechanical brake actuators (EBAs) located 90 degrees apart from each other around the brake and there is one load cell sensor per EBA. Accurate force control of the EBAs provides for a predictable and smooth operation of the braking system during taxi and landing.

SUMMARY

A brake system is disclosed herein. The brake system includes a pressure plate, an end plate, a plurality of rotating discs positioned between the pressure plate and the end plate, an electromechanical brake actuator controller, and an electromechanical brake actuator comprising a ball screw configured to extend to exert a force on the pressure plate, the electromechanical brake actuator operatively coupled to the electromechanical brake actuator controller. Responsive to receiving a command from the electromechanical brake actuator controller, the electromechanical brake actuator is configured to retract the ball screw away from the pressure plate to at least a zero-touch point.

In various embodiments, the electromechanical brake actuator is configured to retract the ball screw away from the pressure plate behind the zero-touch point.

In various embodiments, the brake system further includes a position sensor. In various embodiments, the zero-touch point is determined using the position sensor and wherein the position sensor is at least one of a resolver, tachometer, or Hall sensor.

In various embodiments, the brake system further includes a load cell. In various embodiments, the zero-touch point is determined by: responsive to operating under position control and responsive to an autozero failing to be established for the load cell, determining, by the electromechanical brake actuator controller, a first position of the ball screw in response to the force being applied by the electromechanical brake actuator dropping below a first predetermined force threshold; and determining, by the electromechanical brake actuator controller, the zero-touch point by subtracting a first offset from the first position of the ball screw.

In various embodiments, the brake system further includes a load cell. In various embodiments, the zero-touch point is determined by: responsive to operating under position control and responsive to an autozero being established for the load cell, determining, by the electromechanical brake actuator controller, a second position of the ball screw in response to the force being applied by the electromechanical brake actuator dropping below a second predetermined force threshold; and determining, by the electromechanical brake actuator controller, the zero-touch point by subtracting a second offset from the second position of the ball screw.

In various embodiments, the brake system further includes a load cell. In various embodiments, the zero-touch point is determined by: responsive to operating under force control and responsive to an autozero failing to be established for the load cell, determining, by the electromechanical brake actuator controller, a third position of the ball screw in response to the force being applied by the electromechanical brake actuator dropping below a third predetermined force threshold; and determining, by the electromechanical brake actuator controller, the zero-touch point by subtracting a third offset from the third position of the ball screw.

In various embodiments, the brake system further includes a load cell. In various embodiments, the zero-touch point is determined by: responsive to operating under force control and responsive to an autozero being established for the load cell, determining, by the electromechanical brake actuator controller, a fourth position of the ball screw in response to the force being applied by the electromechanical brake actuator dropping below a fourth predetermined force threshold; and determining, by the electromechanical brake actuator controller, the zero-touch point by subtracting a fourth offset from the fourth position of the ball screw.

Also disclosed herein is an aircraft. The aircraft includes a wheel and a brake system coupled to the wheel. The brake system includes a pressure plate, an end plate, a plurality of rotating discs positioned between the pressure plate and the end plate, an electromechanical brake actuator controller, and an electromechanical brake actuator configured to extend to exert a force on the pressure plate, the electromechanical brake actuator operatively coupled to the electromechanical brake actuator controller. Responsive to receiving a command from the electromechanical brake actuator controller, the electromechanical brake actuator is configured to retract the ball screw away from the pressure plate to at least a zero-touch point.

In various embodiments, the electromechanical brake actuator is configured to retract away from the pressure plate behind the zero-touch point.

In various embodiments, the brake system further includes a position sensor. In various embodiments, the zero-touch point is determined using the position sensor and wherein the position sensor is at least one of a resolver, tachometer, or Hall sensor.

In various embodiments, the brake system further includes a load cell. In various embodiments, the zero-touch point is determined by: responsive to operating under position control and responsive to an autozero failing to be established for the load cell, determining, by the electromechanical brake actuator controller, a first position of a ball screw of the electromechanical brake actuator in response to the force being applied by the electromechanical brake actuator dropping below a first predetermined force threshold; and determining, by the electromechanical brake actuator controller, the zero-touch point by subtracting a first offset from the first position of the ball screw.

In various embodiments, the brake system further includes a load cell. In various embodiments, the zero-touch point is determined by: responsive to operating under position control and responsive to an autozero being established for the load cell, determining, by the electromechanical brake actuator controller, a second position of a ball screw of the electromechanical brake actuator in response to the force being applied by the electromechanical brake actuator dropping below a second predetermined force threshold; and determining, by the electromechanical brake actuator controller, the zero-touch point by subtracting a second offset from the second position of the ball screw.

In various embodiments, the brake system further includes a load cell. In various embodiments, the zero-touch point is determined by: responsive to operating under force control and responsive to an autozero failing to be established for the load cell, determining, by the electromechanical brake actuator controller, a third position of a ball screw of the electromechanical brake actuator in response to the force being applied by the electromechanical brake actuator dropping below a third predetermined force threshold; and determining, by the electromechanical brake actuator controller, the zero-touch point by subtracting a third offset from the third position of the ball screw.

In various embodiments, the brake system further includes a load cell. In various embodiments, the zero-touch point is determined by: responsive to operating under force control and responsive to an autozero being established for the load cell, determining, by the electromechanical brake actuator controller, a fourth position of a ball screw of the electromechanical brake actuator in response to the force being applied by the electromechanical brake actuator dropping below a fourth predetermined force threshold; and determining, by the electromechanical brake actuator controller, the zero-touch point by subtracting a fourth offset from the fourth position of the ball screw.

Also disclosed herein is a method of controlling an electromechanical brake actuator of a brake system. The method includes receiving, by an electromechanical brake actuator controller, a command from a brake control unit, wherein the command is to retract a ball screw within the electromechanical brake actuator away from a pressure plate, the ball screw configured to extend to exert a force on the pressure plate; identifying, by the electromechanical brake actuator controller, a zero-touch point for the electromechanical brake actuator; and commanding, by the electromechanical brake actuator controller, the electromechanical brake actuator to retract the ball screw away from the pressure plate to at least the zero-touch point.

In various embodiments, the electromechanical brake actuator is configured to retract the ball screw away from the pressure plate behind the zero-touch point.

In various embodiments, the zero-touch point is determined by: responsive to operating under position control and responsive to an autozero failing to be established for a load cell, determining, by the electromechanical brake actuator controller, a first position of the ball screw in response to the force being applied by the electromechanical brake actuator dropping below a first predetermined force threshold; and determining, by the electromechanical brake actuator controller, the zero-touch point by subtracting a first offset from the first position of the ball screw.

In various embodiments, the zero-touch point is determined by: responsive to operating under position control and responsive to an autozero being established for a load cell, determining, by the electromechanical brake actuator controller, a second position of the ball screw in response to the force being applied by the electromechanical brake actuator dropping below a second predetermined force threshold; and determining, by the electromechanical brake actuator controller, the zero-touch point by subtracting a second offset from the second position of the ball screw.

In various embodiments, the zero-touch point is determined by: responsive to operating under force control and responsive to an autozero failing to be established for a load cell, determining, by the electromechanical brake actuator controller, a third position of the ball screw in response to the force being applied by the electromechanical brake actuator dropping below a third predetermined force threshold; and determining, by the electromechanical brake actuator controller, the zero-touch point by subtracting a third offset from the third position of the ball screw.

In various embodiments, the zero-touch point is determined by: responsive to operating under force control and responsive to an autozero being established for a load cell, determining, by the electromechanical brake actuator controller, a fourth position of the ball screw in response to the force being applied by the electromechanical brake actuator dropping below a fourth predetermined force threshold; and determining, by the electromechanical brake actuator controller, the zero-touch point by subtracting a fourth offset from the fourth position of the ball screw.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
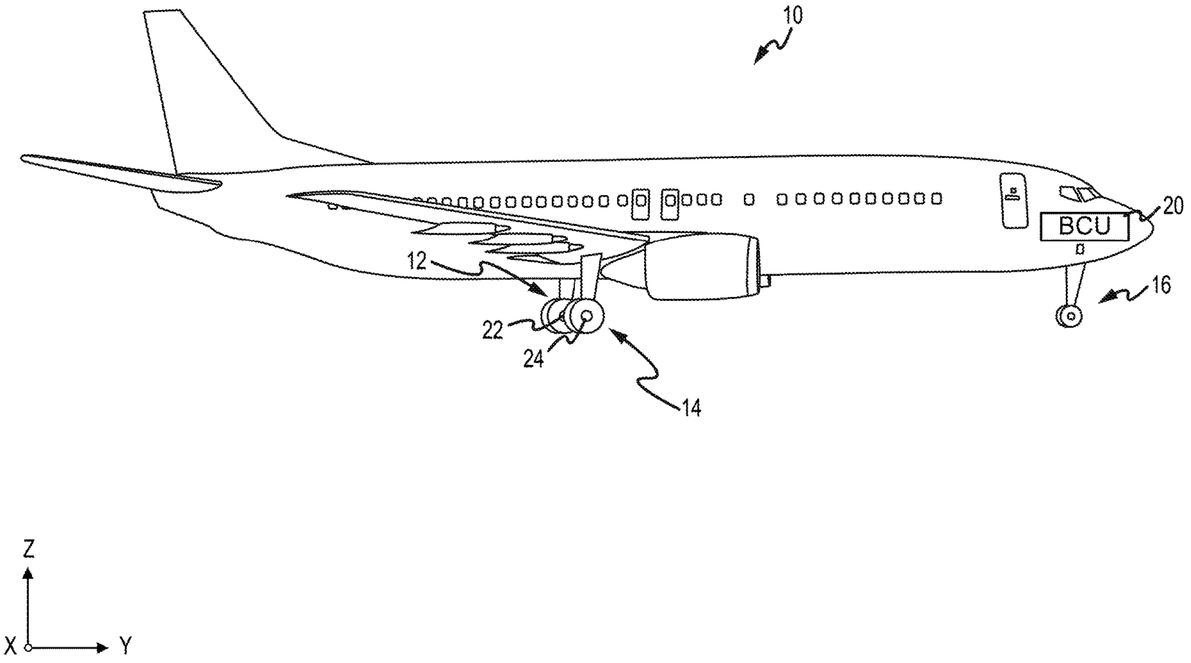
FIG. 1A illustrates an aircraft having multiple landing gear and brakes, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

While described in the context of aircraft applications, and more specifically, in the context of brake control, the various embodiments of the present disclosure may be applied to any suitable application.

As stated previously, a typical E-brake contains four electromechanical brake actuators (EBAs) located 90 degrees apart from each other around the brake and there is one load cell sensor per EBA. However, typically, when a force is commanded by a brake control unit (BCU) and transmitted to an electromechanical brake actuator controller (EBAC), at lower commanded forces, such as 500 pound force (lbf.) (2224 Newtons (N)) per EBA, the force control may be unpredictable due to a signal from a load cell associated with the EBA. That is, typically, load cell signals are in the millivolt (mV) range and are susceptible to noise due to long wire length to the EBAC in the aircraft.

Disclosed herein is a next generation control for an electromechanical brake (E-brake) system. In various embodiments, in response to a nonzero force, i.e. responsive to a pilot depressing a brake pedal, commanded by the BCU (or a function of the EBAC that may generate an internal force command), the EBAC applies a force command, using a force control mechanism of a force controller, such as a proportional-integral-derivative (PID) controller, that commands a force to be applied by the EBA, i.e. rotating, via a motor, a ball screw of the EBA, to force a pressure plate towards an end plate along an axis thereby forcing a brake stack, i.e. rotating discs and stators, together in an axial direction. In various embodiments, the applied force causes the rotational speed of rotating discs to become reduced (i.e., causes braking effect) due to friction between rotating discs, stators, the end plate, and the pressure plate. In response to sufficient force being exerted on the brake stack via the pressure plate, the rotating discs will stop rotating. In various embodiments, the load cell may or may not have auto-zeroing functionality, the auto-zeroing functionality being activated when the EBA has retracted off the brake stack. Typically, a signal of 0 millivolts (mV) from the load cell indicates the ball screw of the EBA has been retracted off the brake stack. However, over time, responsive to the ball screw of the EBA being fully retracted off the brake stack and the load cell indicating a value that is not 0 mV, i.e. a drift mV value, then the EBAC may identify this value as the new zeroed value for the load cell and store the value as an auto-zeroed value for the load cell. In various embodiments, the drift mV value may be between 0.02 mV and 0.05 mV. In various embodiments, the drift mV value may be between −0.02 mV and −0.05 mV. In various embodiments, the auto-zero value may be utilized by the EBAC in determining a corrected measured value of the load cell which is then utilized when a zero force is commanded by the BCU.

In various embodiments, responsive to a zero force being commanded by the BCU to the EBAC, the EBAC utilizes position control, regardless of whether the EBA is still on the brake stack or not, i.e. whether the load cell indicates a force is currently being applied or not to the brake stack, to control the ball screw associated with the EBA to a position away from the brake stack. In various embodiments, a zero force may be commanded responsive to a pilot fully releasing a brake pedal or the BCU identifying an anti-skid condition, among others. In various embodiments, in such an event, the EBAC utilizes a position control mechanism of the position controller for position control. In that regard, in various embodiments, the position control may be used for retraction of the ball screw off the brake stack to the zero-touch point (ZTP) or behind the ZTP up to fully retracting the EBA.

Referring to FIG. 1A, in accordance with various embodiments, an aircraft 10 is illustrated. The aircraft 10 includes a landing gear, which may include a left main landing gear 12, a right main landing gear 14 and a nose landing gear 16. The landing gear support the aircraft 10 when it is not flying, allowing the aircraft 10 to taxi, take off, and land without damage. While the disclosure refers to the three landing gear configurations just referred, the disclosure nevertheless contemplates any number of landing gear configurations.

Aircraft 10 may further include a brake control unit (BCU) 20 for controlling a left main brake mechanism 22 of left main landing gear 12 and a right main brake mechanism 24 of right main landing gear 14. BCU 20 controls the application of brake mechanisms 22, 24 in response to input from aircraft 10 or an authorized user. BCU 20 further controls a parking brake functionality of brake mechanisms 22, 24 to secure aircraft 10 in place. A plurality of wires that independently control the braking and parking brake functionalities run through aircraft 10 from BCU 20 to left main brake mechanism 22 and right main brake mechanism 24.

Figure 1B:
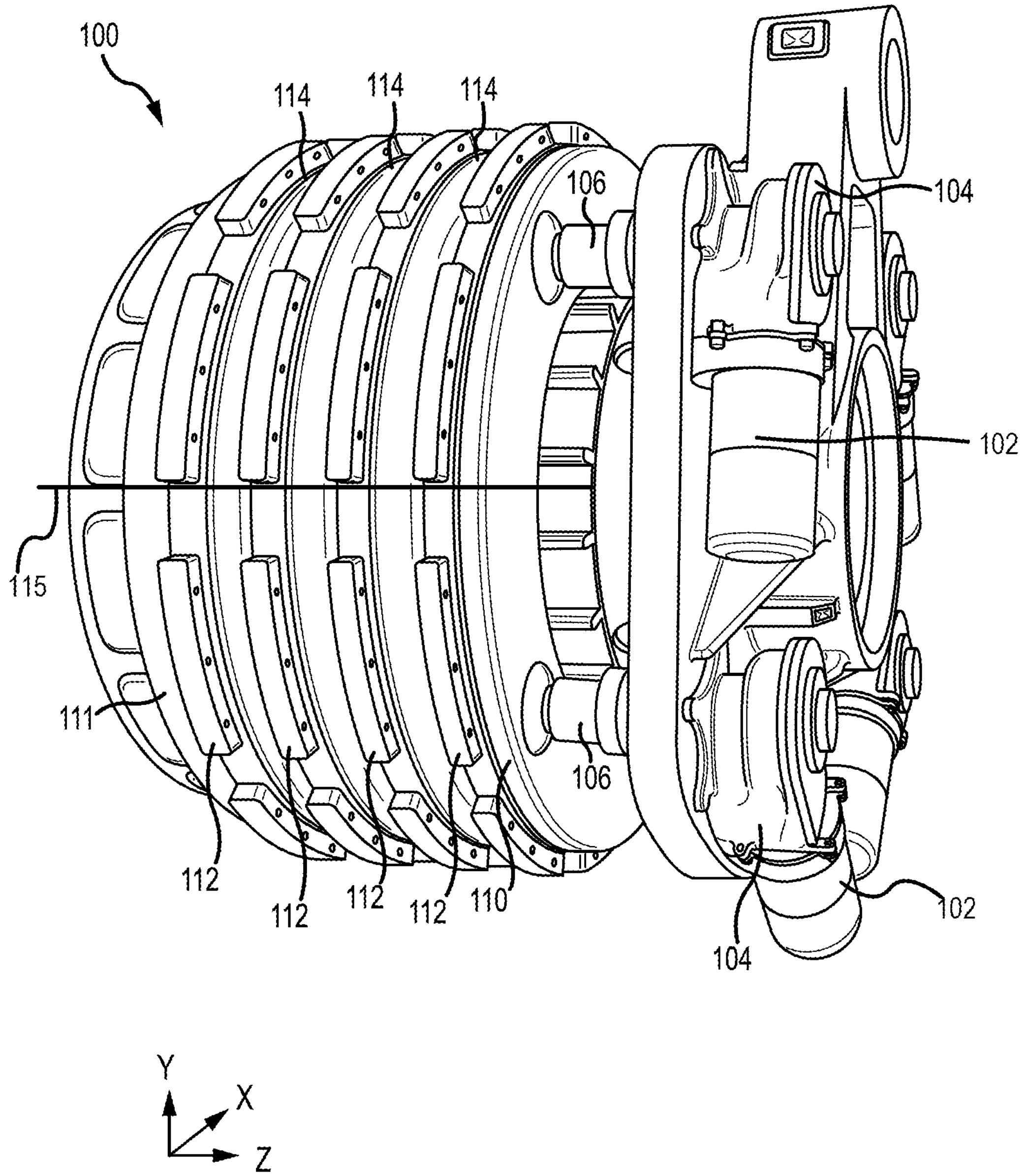
FIG. 1B illustrates an aircraft brake in accordance with various embodiments.

Referring to FIG. 1B, an aircraft brake arrangement 100 in accordance with various embodiments is illustrated. Aircraft brake arrangement 100 may include a plurality of actuator motors 102, a plurality of electromechanical brake actuators (EBAs) 104, a plurality of ball screws 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. In response to sufficient force being exerted on rotating discs 112 via pressure plate 110, the rotating discs 112 will stop rotating.

In order to exert this force onto pressure plate 110, actuator motor 102 may cause EBA 104 to actuate. Although referred to herein as EBA 104, it is contemplated that, in various embodiments, EBA 104 may be an electrohydraulic actuator. In various embodiments, actuator motor 102 may be a brushless motor, such as a permanent magnet synchronous motor (PMSM), a permanent-magnet motor (PMM) or the like. In various embodiments, EBA 104 may be coupled to or otherwise operate a motor shaft and a pressure generating device, such as, for example, a ball screw, a ram, and/or the like. In response to actuation or a brake command, EBA 104 causes the motor shaft to rotate. Rotation of the motor shaft 204 may cause rotation of a ball screw 106 (e.g., see FIG. 2), and rotational motion of the ball screw 106 may be transformed into linear motion of a ball screws 106.

Linear translation of ball screws 106 towards pressure plate 110 applies force on pressure plate 110 towards end plate 111.

Figure 2:
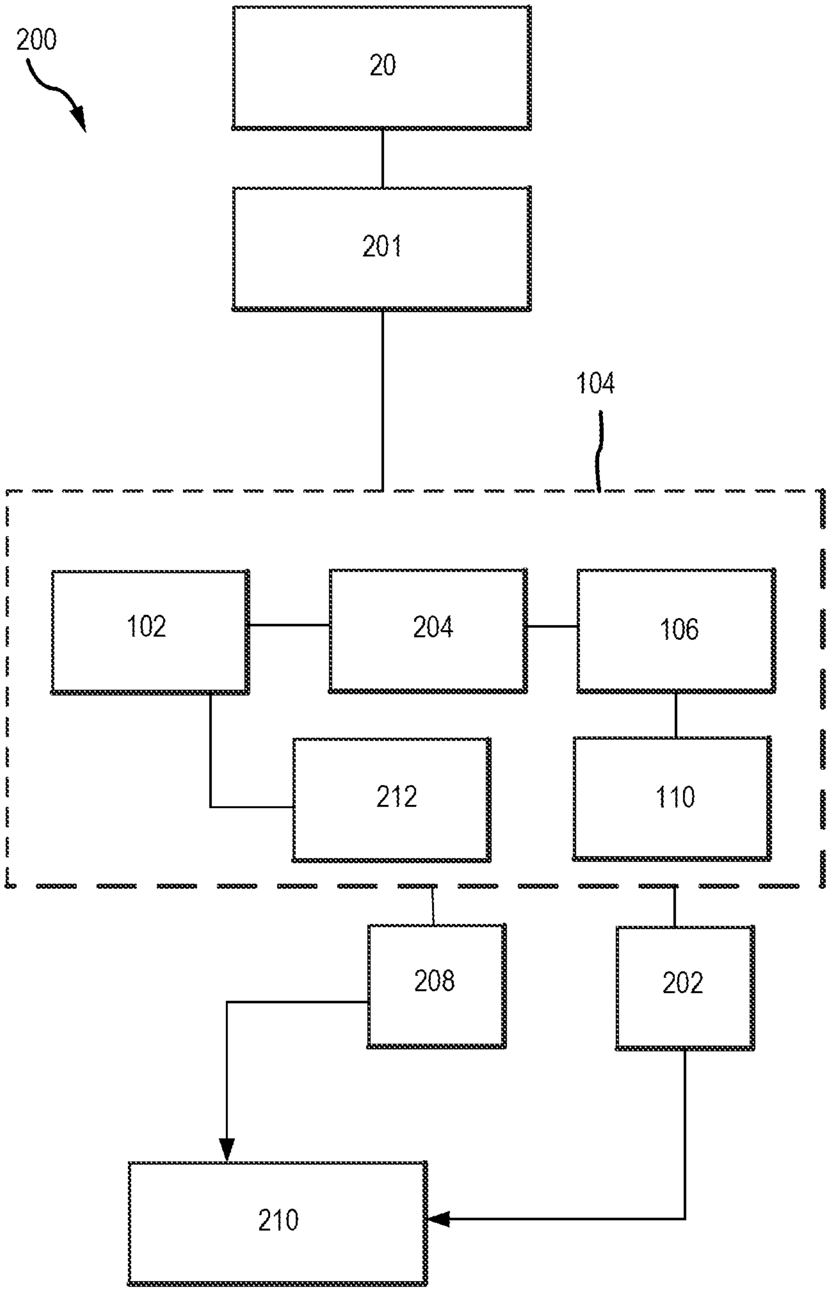
FIG. 2 illustrates a block diagram of an electromechanical brake actuator control system in accordance with various embodiments.

EBA 104 is actuated in response to electrical current being applied to actuator motor 102. The amount of force applied by EBA 104 is related to the amount of electrical current applied to actuator motor 102. With further reference to FIG. 2, in various embodiments, an electromechanical brake actuator control system 200, or brake system, may include an electromechanical brake actuator controller (EBAC) in communication with each EBA 104. In various embodiments, the electromechanical brake actuator control system 200 may include an electrical current sensor 212 to detect an amount of electrical current provided to actuator motor 102. Electrical current sensor 212 may be in communication with actuator motor 102 and/or with various other components of an EBA 104, an electromechanical brake actuator control system 200, and/or an aircraft 10. In various embodiments, electrical current sensor 212 may be disposed on or adjacent to actuator motor 102. However, in various embodiments, the electrical current sensor 212 may be disposed in any location suitable for detection of electrical current supplied to the actuator motor 102, such as, for example, in the EBAC.

Application of electrical current to actuator motor 102 causes rotation of motor shaft 204. In various embodiments, electromechanical brake actuator control system 200 may include a position sensor 208. Position sensor 208 may be configured so as to measure the rotational speed and position of motor shaft 204. In various embodiments, position sensor 208 may be disposed in or adjacent to EBA 104, or on or adjacent to actuator motor 102. However, position sensor 208 may be disposed in any location suitable for detection of the rotational speed and position of motor shaft 204. In various embodiments, position sensor 208 may include a resolver, tachometer, or Hall sensor, among others.

In various embodiments, electromechanical brake actuator control system 200 may include a load cell 202. Load cell 202 may be configured so as to measure the amount of force being applied between ball screws 106 and pressure plate 110. In various embodiments, load cell 202 may be disposed in or adjacent to EBA 104, or on or adjacent to ball screws 106. However, load cell 202 may be disposed in any location suitable for detection of the force being applied between ball screws 106 and pressure plate 110. A controller may receive the detected force and rotational speed, and calculate an adjusted force and an adjusted rotational speed based on those detected values. In various embodiments, electromechanical brake actuator control system 200 may include a fault tolerant module 210.

In various embodiments, a system for brake actuator operation with load cell fault tolerant technology includes four load cells 202, four electrical current sensors 212, four position sensors 208, and at least one controller. The system for multiple brake actuator operation via one load cell may include a fault tolerant module 210. In various embodiments, fault tolerant module 210 may be a controller and/or processor. In various embodiments, fault tolerant module 210 may be implemented in a single controller and/or processor. In various embodiments, fault tolerant module 210 may be implemented in multiple controllers and/or processors. In various embodiments, fault tolerant module 210 may be implemented in an electromechanical actuator controller and/or a brake control unit.

With reference to FIGS. 1B and 2, in various embodiments, the BCU 20 and thus, the EBAC 201, are configured to change between two control modes, i.e. force control and position control, regardless of a current force being applied by the EBA 104 or a current position of the EBA 104. In various embodiments, the EBAC 201 utilizes a respective zero-touch point (ZTP) position for the EBA 104 that is being commanded by the EBAC 201. In various embodiments, the EBAC 201 determines the ZTP position for the EBA 104 while a force is being applied by the EBA 104 via the ball screw 106 to the pressure plate 110, and thus the brake stack, based on whether the EBAC 201 is in position control or force control and based on whether or not the load cell 202 of the EBA 104 has been auto-zeroed. In various embodiments, in an event where the EBAC 201 is in position control and the load cell 202 of the EBA 104 has not been auto-zeroed, the EBAC 201 determines the ZTP position utilizing a position of the ball screw 106 when the force being applied to the brake stack transitions from just above a first predetermined force threshold, for example, 500 lbf. (2224 N), to just below the first predetermined force threshold. In various embodiments, the just above value may be between 1 lbf. (4.448 N) to 5 lbf. (22.241 N) above the first predetermined threshold and the just below values may be between 1 lbf. (4.448 N) to 5 lbf. (22.241 N) below the first predetermined threshold. In various embodiments, once the EBAC 201 has determined the ball screw 106 position at the first predetermined force threshold, then the EBAC 201 determines the ZTP position by subtracting a first offset from a set of predefined offsets from the identified position of the ball screw 106 at the first predetermined force threshold. In various embodiments, the ZTP position for the EBA 104 may be between 0.010 inches (0.0254 centimeter) and 0.025 inches (0.0635 centimeter) behind the identified position of the ball screw 106 at the first predetermined force threshold.

In various embodiments, in an event where the EBAC is in position control and the load cell 202 of the EBA 104 has been auto-zeroed, the EBAC 201 determines the ZTP position utilizing a position of the ball screw 106 when the force being applied to the brake stack transitions from just above a second predetermined force threshold, for example, 100 lbf. (444.822 N), to just below the second predetermined force threshold. In various embodiments, the just above value may be between 1 lbf. (4.448 N) to 5 lbf. (22.241 N) above the second predetermined threshold and the just below values may be between 1 lbf. (4.448 N) to 5 lbf. (22.241 N) below the second predetermined threshold. As described previously, in various embodiments, the auto-zero value associated with the load cell 202 is based on the signal provided by the load cell 202 and whether or not the signal from the load cell has drifted. Typically, the signal of 0 millivolts (mV) from the load cell 202 indicates the ball screw of the EBA has been retracted off the brake stack. However, overtime, responsive to the ball screw of the EBA being fully retracted off the brake stack and the load cell 202 indicating a value that is not 0 mV, i.e. a drift mV value, then the EBAC 201 may identify this value as the new zeroed value for the load cell 202 and store the value as an auto-zeroed value for the load cell 202. In various embodiments, the drift mV value may be between 0.02 mV and 0.05 mV. In various embodiments, the drift mV value may be between −0.02 mV and −0.05 mV. In various embodiments, once the EBAC 201 has determined the ball screw 106 position at the second predetermined force threshold, then the EBAC 201 determines the ZTP position by subtracting a second offset from the set of predefined offsets from the identified position of the ball screw 106 at the second predetermined force threshold. In various embodiments, the ZTP position for the EBA 104 may be between 0.010 inches (0.0254 centimeter) and 0.025 inches (0.0635 centimeter)

behind the identified position of the ball screw 106 at the second predetermined force threshold.

In various embodiments, in an event where the EBAC is in force control and the load cell 202 of the EBA 104 has not been auto-zeroed, the EBAC 201 determines the ZTP position utilizing a position of the ball screw 106 when the force being applied to the brake stack transitions from just above a third predetermined force threshold, for example, 500 lbf. (2224 N), to just below the third predetermined force threshold at the third predetermined force threshold. In various embodiments, the just above value may be between 1 lbf. (4.448 N) to 5 lbf. (22.241 N) above the third predetermined threshold and the just below values may be between 1 lbf. (4.448 N) to 5 lbf. (22.241 N) below the third predetermined threshold. In various embodiments, once the EBAC 201 has determined the ball screw 106 position at the third predetermined force threshold, then the EBAC 201 determines the ZTP position by subtracting a third offset from the set of predefined offsets from the identified position of the ball screw 106. In various embodiments, the ZTP position for the EBA 104 may be between 0.010 inches (0.0254 centimeter) and 0.025 inches (0.0635 centimeter) behind the identified position of the ball screw 106 at the third predetermined force threshold.

In various embodiments, in an event where the EBAC is in force control and the load cell 202 of the EBA 104 has been auto-zeroed, the EBAC 201 determines the ZTP position utilizing a position of the ball screw 106 when the force being applied to the brake stack transitions from just above a fourth predetermined force threshold, for example, 100 lbf. (444.822 N), to just below the fourth predetermined force threshold. In various embodiments, the just above value may be between 1 lbf. (4.448 N) to 5 lbf. (22.241 N) above the fourth predetermined threshold and the just below values may be between 1 lbf. (4.448 N) to 5 lbf. (22.241 N) below the fourth predetermined threshold. In various embodiments, once the EBAC 201 has determined the ball screw 106 position at the fourth predetermined force threshold, then the EBAC 201 determines the ZTP position by subtracting a fourth offset from the set of predefined offsets from the identified position of the ball screw 106 at the fourth predetermined force threshold. In various embodiments, the ZTP position for the EBA 104 may be between 0.010 inches (0.0254 centimeter) and 0.025 inches (0.0635 centimeter) behind the identified position of the ball screw 106 at the fourth predetermined force threshold.

In various embodiments, once the EBAC 201 has determined the ZTP position for the EBA 104, then in response to receiving a command from the BCU 20, the EBAC 201 determines whether the received command is a brake force command or a position command. In the event that the received command is a force command, the EBAC 201 initiates a force command, using a force control mechanism of a force controller, such as a proportional-integral-derivative (PID) controller, that commands a force to be applied by the EBA 104, i.e. rotating, via a motor, a ball screw 106 of the EBA 104, to force a pressure plate towards an end plate along an axis thereby forcing a brake stack, i.e. rotating discs and stators, together in an axial direction.

In the event that the received command is a position command, i.e. a command related to a pilot fully releasing a brake pedal or the BCU 20 identifying an anti-skid condition, among others, the EBAC 201 applies a position command, using a position control mechanism of a position controller, such as a proportional-integral-derivative (PID) controller, that commands the EBA 104 to retract, i.e. rotating, via a motor, the ball screw 106 of the EBA 104 off of the pressure plate 110, and thus the brake stack, to the ZTP or behind the ZTP up to fully retracting the ball screw 106 of the EBA 104.

Figure 3:
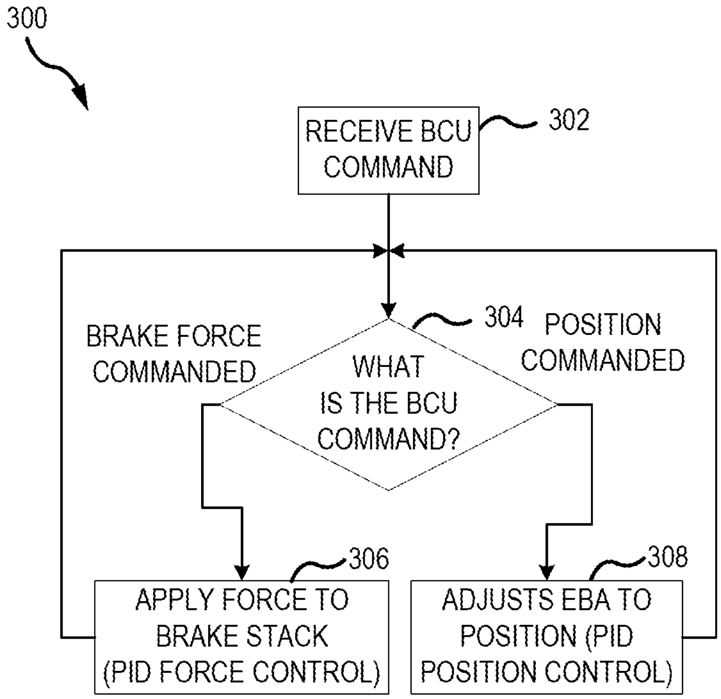
FIG. 3 illustrates a method for control of an electromechanical brake (E-brake) system, in accordance with various embodiments.

Referring now to FIG. 3, in accordance with various embodiments, a method 300 for control of an electromechanical brake (E-brake) system is illustrated. The method 300 may be performed by an electromechanical brake actuator controller (EBAC) 201 described above with respect to FIG. 2. At block 302, the EBAC receives a command from a brake control unit, such as BCU 20 of FIG. 1A. At block 304, the EBAC determines whether the received command is a brake force command or a position command. If at block 304 the received command is a force command, at block 306, the EBAC initiates a force command, using a force control mechanism of a force controller, such as a proportional-integral-derivative (PID) controller, that commands a force to be applied by the electromechanical brake actuator (EBA), such as EBA 104 of FIG. 1B, i.e. rotating, via a motor, a ball screw, such as ball screw 106 of FIG. 1B, of the EBA, to force a pressure plate towards an end plate along an axis thereby forcing a brake stack, i.e. rotating discs and stators, together in an axial direction. If at block 304 the received command is a position command, at block 308, the EBAC initiates a position command, using a position control mechanism of a position controller, such as a proportional-integral-derivative (PID) controller, that commands the EBA to retract, i.e. rotating, via a motor, the ball screw of the EBA off of the pressure plate, and thus the brake stack, to the ZTP or behind the ZTP up to fully retracting the ball screw of the EBA.

Figure 4:
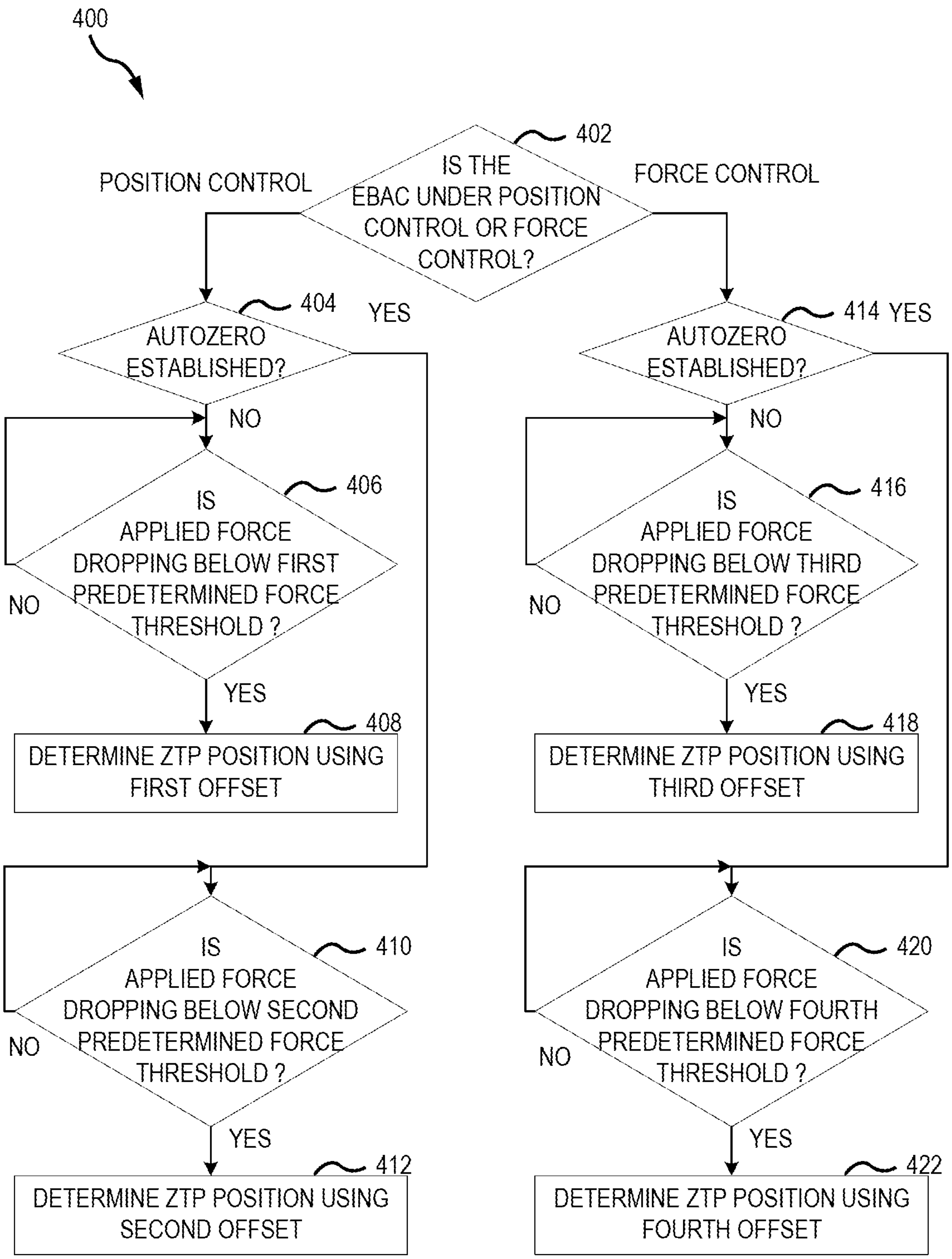
FIG. 4 illustrates a method for determining a zero-touch point (ZTP) for an electromechanical brake actuator of an electromechanical brake (E-brake) system, in accordance with various embodiments.

Referring now to FIG. 4, in accordance with various embodiments, a method 400 for determining a zero-touch point (ZTP) for an electromechanical brake actuator of an electromechanical brake (E-brake) system is illustrated. The method 400 may be performed by an electromechanical brake actuator controller (EBAC) 201 described above with respect to FIG. 2. At block 402, the EBAC determines whether the EBA is under position control or force control. If at block 402 the EBA is under position control, at block 404 the EBAC determines whether autozero for the load cell is established. If at block 404 autozero for the load cell has not been established, then at block 406, the EBAC determines whether the force being applied by the EBA to the brake stack is falling below a first predetermined threshold, i.e. transitioning from just above a first predetermined force threshold to just below the first predetermined force threshold. If at block 406 the force being applied is not falling below the first predetermined threshold, the operation returns to block 406. If at block 406 the force being applied is falling below the first predetermined threshold, at block 408, the EBAC determines a first ball screw position at the first predetermined force threshold and subtracts a first offset from a set of predefined offsets from the identified position of the ball screw at the first predetermined force threshold to identify the ZTP position.

If at block 404 autozero for the load cell has been established, then at block 410, the EBAC determines whether the force being applied by the EBA to the brake stack is falling below a second predetermined threshold, i.e. transitioning from just above a second predetermined force threshold to just below the second predetermined force threshold. If at block 410 the force being applied is not falling below the second predetermined threshold, the operation returns to block 410. If at block 410 the force being applied is falling below the second predetermined threshold, at block 412, the EBAC determines a second ball screw position at the second predetermined force threshold and subtracts a second offset from a set of predefined offsets from the identified position of the ball screw at the second predetermined force threshold to identify the ZTP position.

If at block 402 the EBA is under force control, at block 414 the EBAC determines whether autozero for the load cell is established. If at block 414 autozero for the load cell has not been established, then at block 416, the EBAC determines whether the force being applied by the EBA to the brake stack is falling below a third predetermined threshold, i.e. transitioning from just above a third predetermined force threshold to just below the third predetermined force threshold. If at block 416 the force being applied is not falling below the third predetermined threshold, the operation returns to block 416. If at block 416 the force being applied is falling below the third predetermined threshold, at block 418, the EBAC determines a third ball screw position at the third predetermined force threshold and subtracts a third offset from a set of predefined offsets from the identified position of the ball screw at the third predetermined force threshold to identify the ZTP position.

If at block 414 autozero for the load cell has been established, then at block 420, the EBAC determines whether the force being applied by the EBA to the brake stack is falling below a fourth predetermined threshold, i.e. transitioning from just above a fourth predetermined force threshold to just below the fourth predetermined force threshold. If at block 420 the force being applied is not falling below the fourth predetermined threshold, the operation returns to block 420. If at block 420 the force being applied is falling below the fourth predetermined threshold, at block 412, the EBAC determines a fourth ball screw position at the fourth predetermined force threshold and subtracts a second offset from a set of predefined offsets from the identified position of the ball screw at the fourth predetermined force threshold to identify the ZTP position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system comprising:
- a pressure plate;
- an end plate;
- a plurality of rotating discs positioned between the pressure plate and the end plate;
- an electromechanical brake actuator controller; and
- an electromechanical brake actuator comprising a ball screw configured to extend to exert a force on the pressure plate, the electromechanical brake actuator operatively coupled to the electromechanical brake actuator controller;
- wherein, responsive to receiving a command from the electromechanical brake actuator controller, the electromechanical brake actuator is configured to retract the ball screw away from the pressure plate to at least one of a first zero-touch point, a second zero-touch point, a third zero-touch point, or a fourth zero-touch point,
- wherein the brake system further comprises a load cell,
- wherein the third zero-touch point is determined by:
  - responsive to operating under force control and responsive to an autozero failing to be established for the load cell, determining, by the electromechanical brake actuator controller, a third position of the ball screw in response to the force being applied by the electromechanical brake actuator dropping below a third predetermined force threshold; and
  - determining, by the electromechanical brake actuator controller, the third zero-touch point by subtracting a third offset from the third position of the ball screw, and
- wherein the fourth zero-touch point is determined by:
  - responsive to operating under the force control and responsive to the autozero being established for the load cell, determining, by the electromechanical brake actuator controller, a fourth position of the ball screw in response to the force being applied by the electromechanical brake actuator dropping below a fourth predetermined force threshold; and
  - determining, by the electromechanical brake actuator controller, the fourth zero-touch point by subtracting a fourth offset from the fourth position of the ball screw.

2. The brake system of claim 1, wherein the electromechanical brake actuator is configured to retract the ball screw away from the pressure plate behind the at least one of the first zero-touch point, the second zero-touch point, the third zero-touch point, or the fourth zero-touch point.

3. The brake system of claim 1, wherein the brake system further comprises:

a position sensor, wherein the first zero-touch point, the second zero-touch point, the third zero-touch point, and the fourth zero-touch point are determined using the position sensor and wherein the position sensor is at least one of a resolver, tachometer, or Hall sensor.

4. The brake system of claim 3, wherein the brake system further comprises:

wherein the first zero-touch point is determined by:

responsive to operating under position control and responsive to the autozero failing to be established for the load cell, determining, by the electromechanical brake actuator controller, a first position of the ball screw in response to the force being applied by the electromechanical brake actuator dropping below a first predetermined force threshold; and determining, by the electromechanical brake actuator controller, the first zero-touch point by subtracting a first offset from the first position of the ball screw.

5. The brake system of claim 3, wherein the brake system further comprises:

wherein the second zero-touch point is determined by:

responsive to operating under position control and responsive to the autozero being established for the load cell, determining, by the electromechanical brake actuator controller, a second position of the ball screw in response to the force being applied by the electromechanical brake actuator dropping below a second predetermined force threshold; and determining, by the electromechanical brake actuator controller, the second zero-touch point by subtracting a second offset from the second position of the ball screw.

6. An aircraft, comprising:

a wheel; and a brake system coupled to the wheel, wherein the brake system comprises:

a pressure plate;

an end plate;

a plurality of rotating discs positioned between the pressure plate and the end plate;

an electromechanical brake actuator controller; and an electromechanical brake actuator comprising a ball screw configured to extend to exert a force on the pressure plate, the electromechanical brake actuator operatively coupled to the electromechanical brake actuator controller;

wherein, responsive to receiving a command from the electromechanical brake actuator controller, the electromechanical brake actuator is configured to retract away from the pressure plate to at least one of a first zero-touch point, a second zero-touch point, a third zero-touch point, or a fourth zero-touch point, wherein the brake system further comprises a load cell, wherein the third zero-touch point is determined by:

responsive to operating under force control and responsive to an autozero failing to be established for the load cell, determining, by the electromechanical brake actuator controller, a third position of the ball screw in response to the force being applied by the electromechanical brake actuator dropping below a third predetermined force threshold; and determining, by the electromechanical brake actuator controller, the third zero-touch point by subtracting a third offset from the third position of the ball screw, and wherein the fourth zero-touch point is determined by:

responsive to operating under the force control and responsive to the autozero being established for the load cell, determining, by the electromechanical brake actuator controller, a fourth position of the ball screw in response to the force being applied by the electromechanical brake actuator dropping below a fourth predetermined force threshold; and determining, by the electromechanical brake actuator controller, the fourth zero-touch point by subtracting a fourth offset from the fourth position of the ball screw.

7. The aircraft of claim 6, wherein the electromechanical brake actuator is configured to retract away from the pressure plate behind the at least one of the first zero-touch point, the second zero-touch point, the third zero-touch point, or the fourth zero-touch point.

8. The aircraft of claim 6, wherein the brake system further comprises:

a position sensor, wherein the first zero-touch point, the second zero-touch point, the third zero-touch point, and the fourth zero-touch point are determined using the position sensor and wherein the position sensor is at least one of a resolver, tachometer, or Hall sensor.

9. The aircraft of claim 8, wherein the brake system further comprises:

wherein the first zero-touch point is determined by:

responsive to operating under position control and responsive to the autozero failing to be established for the load cell, determining, by the electromechanical brake actuator controller, a first position of the ball screw of the electromechanical brake actuator in response to the force being applied by the electromechanical brake actuator dropping below a first predetermined force threshold; and determining, by the electromechanical brake actuator controller, the first zero-touch point by subtracting a first offset from the first position of the ball screw.

10. The aircraft of claim 8, wherein the brake system further comprises:

wherein the second zero-touch point is determined by:

responsive to operating under position control and responsive to the autozero being established for the load cell, determining, by the electromechanical brake actuator controller, a second position of the ball screw of the electromechanical brake actuator in response to the force being applied by the electromechanical brake actuator dropping below a second predetermined force threshold; and determining, by the electromechanical brake actuator controller, the second zero-touch point by subtracting a second offset from the second position of the ball screw.

11. A method of controlling an electromechanical brake actuator of a brake system comprising:

receiving, by an electromechanical brake actuator controller, a command from a brake control unit, wherein the command is to retract a ball screw within the electromechanical brake actuator away from a pressure plate, the ball screw configured to extend to exert a force on the pressure plate;

identifying, by the electromechanical brake actuator controller, at least one of a first zero-touch point, a second zero-touch point, a third zero-touch point, or a fourth zero-touch point for the electromechanical brake actuator; and commanding, by the electromechanical brake actuator controller, the electromechanical brake actuator to retract the ball screw away from the pressure plate to the at least one of the first zero-touch point, the second zero-touch point, the third zero-touch point, or the fourth zero-touch point, wherein the third zero-touch point is determined by the method further comprising:

responsive to operating under force control and responsive to an autozero failing to be established for a load cell, determining, by the electromechanical brake actuator controller, a third position of the ball screw in response to the force being applied by the electromechanical brake actuator dropping below a third predetermined force threshold; and determining, by the electromechanical brake actuator controller, the third zero-touch point by subtracting a third offset from the third position of the ball screw, and wherein the fourth zero-touch point is determined by the method further comprising:

responsive to operating under the force control and responsive to the autozero being established for the load cell, determining, by the electromechanical brake actuator controller, a fourth position of the ball screw in response to the force being applied by the electromechanical brake actuator dropping below a fourth predetermined force threshold; and determining, by the electromechanical brake actuator controller, the fourth zero-touch point by subtracting a fourth offset from the fourth position of the ball screw.

12. The method of claim 11, wherein the electromechanical brake actuator is configured to retract the ball screw away from the pressure plate behind the at least one of the first zero-touch point, the second zero-touch point, the third zero-touch point, or the fourth zero-touch point.

13. The method of claim 11, wherein the first zero-touch point is determined by the method further comprising:

responsive to operating under position control and responsive to the autozero failing to be established for the load cell, determining, by the electromechanical brake actuator controller, a first position of the ball screw in response to the force being applied by the electromechanical brake actuator dropping below a first predetermined force threshold; and determining, by the electromechanical brake actuator controller, the first zero-touch point by subtracting a first offset from the first position of the ball screw.

14. The method of claim 11, wherein the second zero-touch point is determined by the method further comprising:

responsive to operating under position control and responsive to the autozero being established for the load cell, determining, by the electromechanical brake actuator controller, a second position of the ball screw in response to the force being applied by the electromechanical brake actuator dropping below a second predetermined force threshold; and determining, by the electromechanical brake actuator controller, the second zero-touch point by subtracting a second offset from the second position of the ball screw.

* * * * *